2 Sheets—Sheet 1.

O. C. Du SOUCHET.
Check-Row Corn Planter and Drill.

No. 209,671. Patented Nov. 5, 1878.

WITNESSES:
Henry N. Miller
C. Sedgwick

INVENTOR:
O. C. Du Souchet
BY Munn &Co
ATTORNEYS.

N. PETERS, PHOTO-LITHOGRAPHER, WASHINGTON, D. C.

2 Sheets—Sheet 2.
O. C. Du SOUCHET.
Check-Row Corn Planter and Drill.
No. 209,671. Patented Nov. 5, 1878.
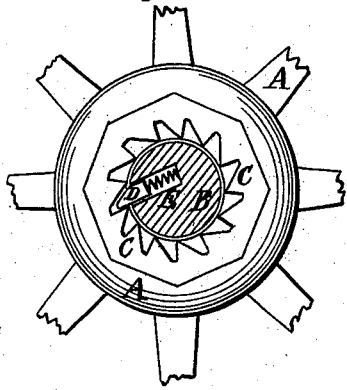
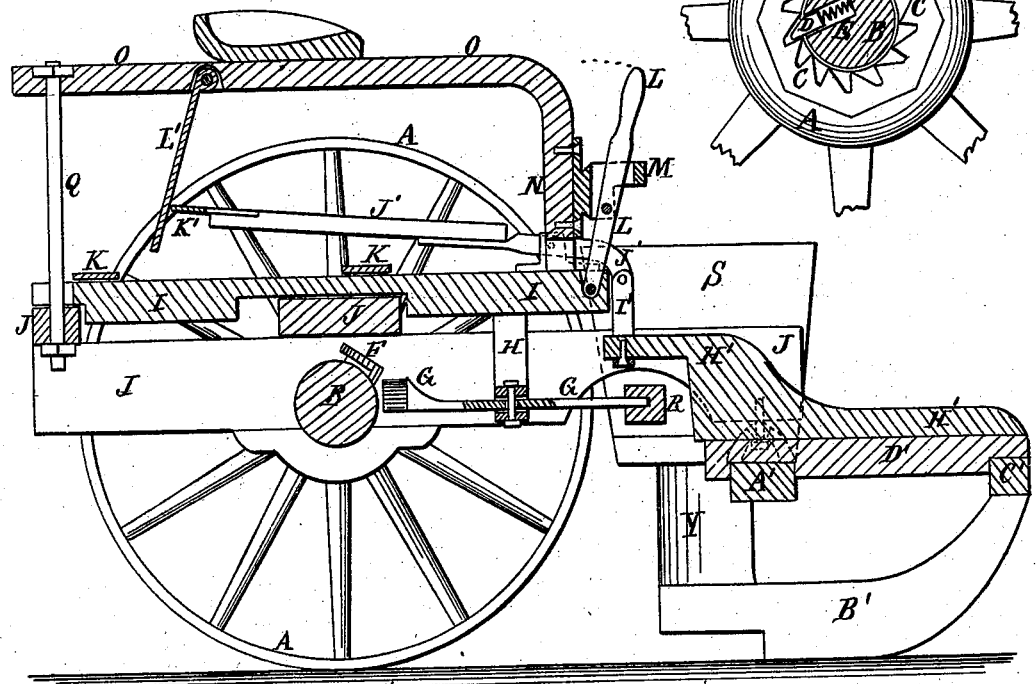
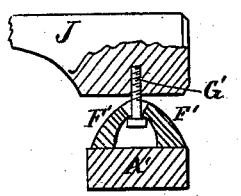
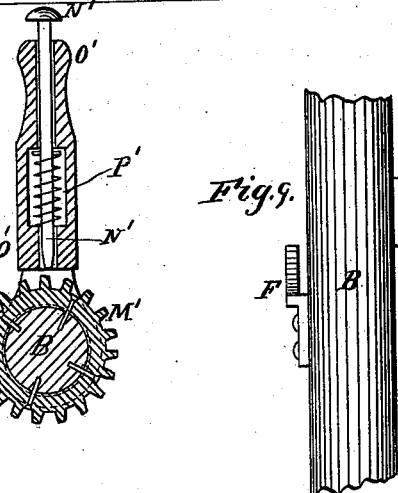
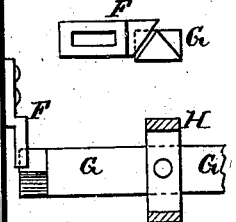
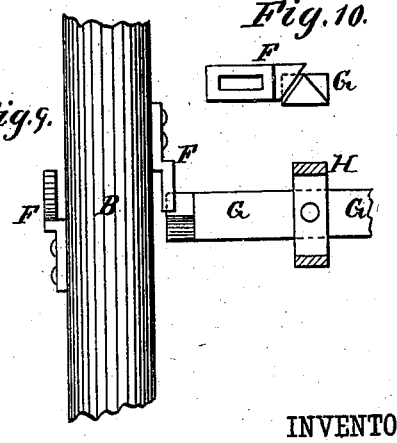
WITNESSES:
Henry N. Miller
C. Sedgwick
INVENTOR:
O. C. Du Souchet
BY Munn &Co
ATTORNEYS.

UNITED STATES PATENT OFFICE.

OSMAN C. DU SOUCHET, OF ALEXANDRIA, MISSOURI.

IMPROVEMENT IN CHECK-ROW CORN PLANTER AND DRILL.

Specification forming part of Letters Patent No. 209,671, dated November 5, 1878; application filed August 6, 1878.

*To all whom it may concern:*

Figure 1:
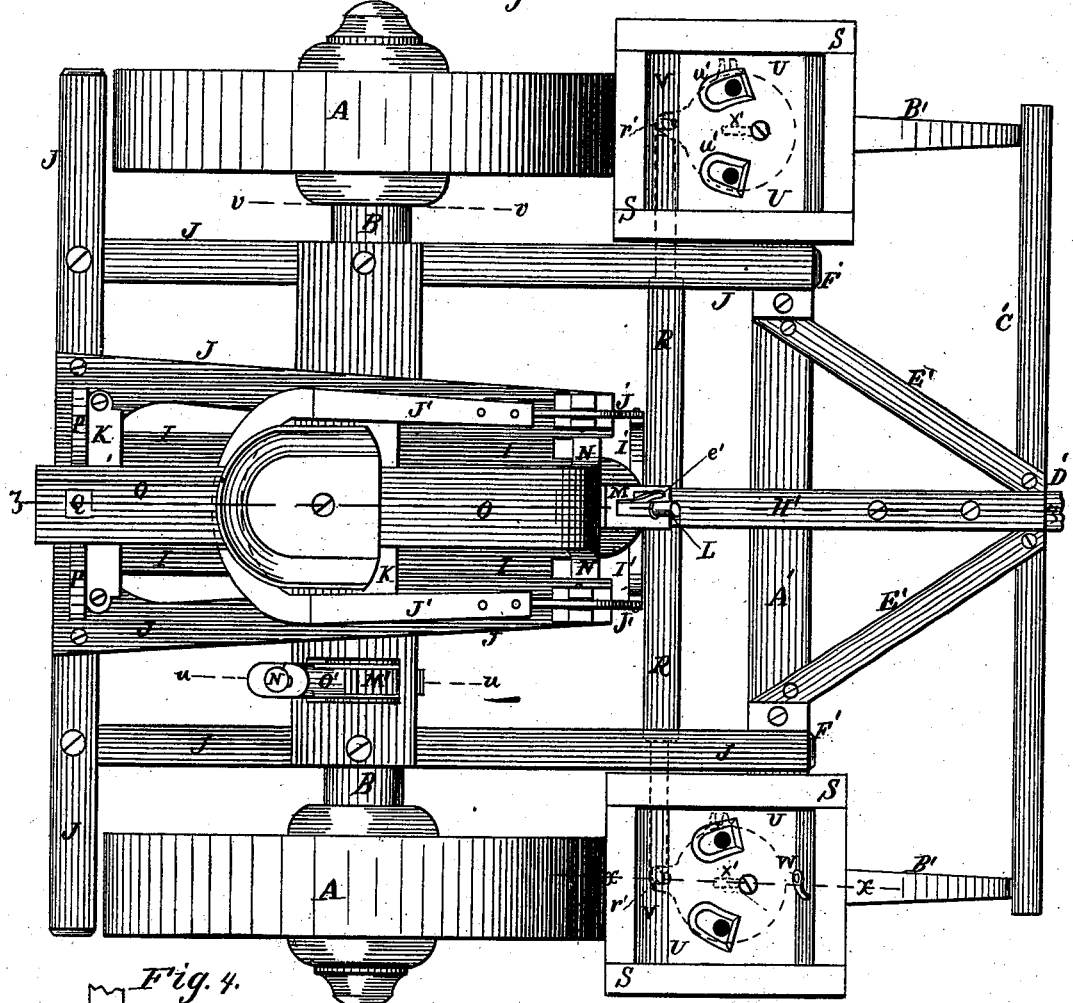
Figure 4:
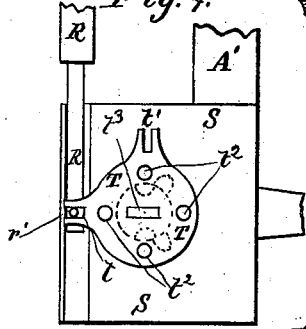
Figure 2:
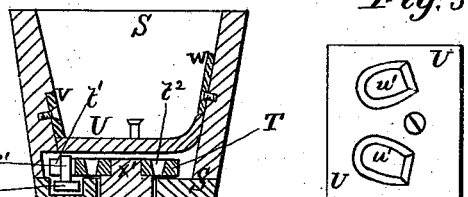
Figure 3:
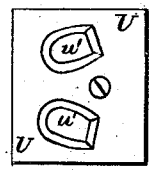
Figure 5:
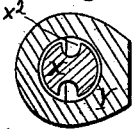

Be it known that I, OSMAN C. DU SOUCHET, of Alexandria, in the county of Clarke and State of Missouri, have invented a new and Improved Check-Row Corn Planter and Drill, of which the following is a specification:

Figure 1, Sheet 1, is a top view of my improved machine. Fig. 2, Sheet 1, is a vertical section of the seed-hopper and the standard and their attachments, taken through the line *x x*, Fig. 1. Fig. 3, Sheet 1, is a detail view of the false bottom or guard-plate. Fig. 4, Sheet 1, is a detail top view of the seed-dropping plate. Fig. 5, Sheet 1, is a detail cross-section of the standard and the dropping-cylinder, taken through the line *y y*, Fig. 2. Fig. 6, Sheet 2, is a vertical longitudinal section of the machine, taken through the line *z z*, Fig. 1. Fig. 7, Sheet 2, is a detail cross-section of the axle, taken through the line *v v* Fig. 1, and showing the ratchet-wheel and pawl. Fig. 8, Sheet 2, is a detail section taken through the line *u u*, Fig. 1, showing the adjusting-lever, pawl, and ratchet-wheel. Fig. 9, Sheet 2, is a detail view of a part of the axle and the cams and lever that operate the seed-dropping slide. Fig. 10, Sheet 2, is a plan view of one of the cams, and showing the lever in end view. Fig. 11, Sheet 2, is a detail section of the hinge-coupling.

Similar letters of reference indicate corresponding parts.

The object of this invention is to furnish an improved corn-planter, which shall be so constructed that its operating mechanism may be at all times under the control of the driver, which will plant the corn in accurate check-row, and which shall be simple in construction, convenient in use, and easily manipulated and controlled.

A A are the wheels, which revolve upon the journals of the axle B, and are made to carry the said axle with them in their revolution when the machine is drawn forward by the ratchet-wheel C and the spring-pawl D E.

The ratchet-wheel C is cast in octagonal form to fit into an octagonal cavity in the wheel-hub, whether an iron or wooden hub be used, so that the said ratchet-wheel can be readily replaced when worn.

The pawl D is a pin, having its outer end beveled upon one side, and which is placed in a hole in the axle B, and is held out against the teeth of the ratchet-wheel C by a spiral spring, E, placed beneath in the said hole in the axle B.

To the opposite sides of the middle part of the axle B are attached two cams, F, the outer parts of which are slotted longitudinally to receive the bolts by which they are secured to the said axle B. The cams F are made with an offset, as shown in Fig. 9, so that their inner parts may stand out a little from the axle B, and have their inner ends beveled off to strike against the inclined sides of the triangular-shaped rear end of the lever G, and thus move it alternately in opposite directions. The lever G is supported by and pivoted to the bend of a U-shaped bar, H, the ends of which are bolted to the lower side of a board, I, which slides upon the cross-bars of the frame J, and is kept in place by keepers K, attached to the inner longitudinal bars of the said frame.

To the forward end of the sliding board I is pivoted the lower end of a lever, L, which is pivoted to the lower part of the keeper M, through which it passes, so that by operating the said lever L the lever G may be moved forward out of gear with the cams F, or moved rearward into gear with the said cams F. To the side of the upper part of the lever L is attached a small spring, *e'*, which enters notches in the keeper M to hold the said lever securely in either position. The keeper M is attached to the forward standard, N, of the seat-board O, which standard and seat-board may be made in one piece, bent at an angle, as shown in Fig. 6. The rear end of the seat-board O is supported by the two inclined standards or braces, P and the upright bolt Q.

The forward end of the lever G works in a slot in the center of the sliding bar R, the ends of which, or bars attached to said ends, work in a groove in the rear parts of the bottoms of the seed-hoppers S, and have studs or pins *r'* formed upon or attached to them to enter slots or notches $t^1$ formed in the edges of the dropping-plates T, or in projections formed upon the said edges. In the plates T are formed pairs of holes, $t^2$, to receive the seed and carry it to the discharge-passages, which holes are made of such a size as to contain enough seed for a hill.

Several notches, $t^1$, and several pairs of seed-dropping holes, $t^2$, are formed in the plates T, so that by adjusting the said plates more or less seed may be dropped for a hill, as may be desired.

The seed-dropping plates T are covered with a false bottom, U, secured in place by a cleat, V, attached to one side of the hopper S, and by a cam, W, pivoted to the other side of the said hopper. In the false bottom U are formed two holes, $u^1$, in such positions as to be over the pair of seed-dropping holes that are being used when the said holes are away from the discharge-passages, to allow the seed to pass into the said seed-dropping holes freely. In the centers of the seed-dropping plates T are formed slots $t^3$, to receive tenons $x^1$, formed upon the upper ends of the upright cylinders X, which are fitted into and work in the cavities of the standards Y. In the opposite sides of the cylinders X are formed longitudinal grooves $x^2$, in such positions as to come opposite recesses or passages in the bottoms of the hoppers S at the same time that the filled holes of the seed-dropping plates T come over the said recesses. When each groove $x^2$ is in position to receive seed from the seed-dropping plate T, its lower end is closed by a plate, Z, attached to the lower end of the hollow standard Y, which covers about one-half of the lower end of the cylinder X. The seed is stopped by and rests upon the plate Z until the cylinder X is again moved, when it is pushed off the said plate Z by the said cylinder X and drops to the ground in a bunch, without any liability of being scattered. The upper ends of the hollow standards Y are attached to the bottoms of the seed-hoppers S, or to the ends of the cross-bar A', to which the said hoppers are attached. To the lower ends of the hollow standards Y are attached the forked rear ends of the runners B', by which the furrows are opened to receive the seed. The forward ends of the runners B' are attached to the ends of the cross-bar C'. To the centers of the cross-bars A' C' is attached the tongue D', and the said cross-bars are strengthened by the inclined bars or braces E', also attached to them. To the cross-bar A', at the inner sides of the seed-hoppers S, are attached metal blocks F', the upper sides of which are rounded off or made V-shaped for the forward ends of the side bars of the frame J to rest upon. The blocks F' are perforated or slotted through their centers to receive the bolts G', and are recessed upon their lower sides to receive the heads of the said bolts G'. The bolts G' are attached to the ends of the side bars of the frame J. The blocks F' and the bolts G' thus connect the frame of the carriage with the frame of the planter, so that the said carriage may be drawn by the said planter, and at the same time serve as hinges, to allow the planter to be raised from the ground and the machine to adjust itself to uneven ground.

To the tongue D', or to the cross-bars A' C', is attached an arm, H', the rear end of which projects, and to it is attached the center of a curved bar, I'. The ends of the curved bar I' are hinged to the downwardly-curved forward ends of the levers J', which are pivoted to supports attached to the forward ends of the inner longitudinal bars of the frame J. The rear ends of the levers J' are connected by a bar or plate, K'.

To the seat-board O is hinged the upper end of a bar, L', which is made of such a length that when the rear ends of the levers J' are lowered to raise the planter from the ground the lower end of the said hinged bar L' will swing forward over the cross-bar or plate K', and thus lock the said levers in place, holding the planter raised. When the planter is lowered into working position the hinged bar L' rests against the rear edge of the cross-bar or plate K'.

To the axle B is attached a ratchet-wheel, M', with the teeth of which engages the lower end of a pawl, N'. The pawl N' is placed in the cavity of the hollow lever O', and is held up out of gear with the ratchet-wheel M' by a spiral spring, P', also placed within the cavity of the said lever O'. The upper end of the pawl N' projects above the upper end of the lever O', so that the driver can readily push it down into gear with the ratchet-wheel M'. The lower end of the lever O' is forked to receive the ratchet-wheel M', and is pivoted to the axle B upon the opposite sides of the said ratchet-wheel M'.

By this construction, by operating the lever O' the driver can turn the axle B, and thus adjust the seed-dropping device so that the seed can be planted in accurate check-row. This arrangement is specially useful in starting in at the ends of the rows and in case the cross-rows should get out of line by the slipping of the wheels or from other causes.

When it is desired to plant the seen in drills, two or more additional cams F may be attached to the axle B, or to a drum attached to the said axle, to operate the lever G four or more times during each revolution of the drive-wheels A.

Having thus fully described my invention, I claim as new and desire to secure by Letters Patent—

1. The combination, with axle B, having spring-pawl D E, end-beveled on one side and working in a ratchet on the inside of wheel-hub, of the ratchet-wheel M', pawl N', and hollow lever O', as and for the purpose specified.

2. The combination of the sliding board I, the lever L, the keeper M, and the bar H with the frame J and the lever G, for throwing the said lever into and out of gear with the cams F, substantially as herein shown and described.

OSMAN CHERISH DU SOUCHET.

Witnesses:
JOHN R. DIXSON,
R. C. LODOUISKY.